United States Patent [19]

Yagi

[11] 4,168,094

[45] Sep. 18, 1979

[54] DEVICE FOR COVERING UP A PARCEL FLOOR IN AN AUTOMOBILE

[75] Inventor: Takeo Yagi, Toyota, Japan

[73] Assignee: Toyota Jidosha Kogyo Kabushiki Kaisha, Toyota, Japan

[21] Appl. No.: 845,658

[22] Filed: Oct. 26, 1977

[30] Foreign Application Priority Data

Oct. 30, 1976 [JP] Japan .................... 51-146451[U]
Dec. 8, 1976 [JP] Japan .................... 51-165180[U]

[51] Int. Cl.² .......................................... B60R 5/04
[52] U.S. Cl. ........................... 296/37.16; 224/42.44
[58] Field of Search .................. 296/37.1, 37.5, 37.8, 296/37.16, 37.14; 224/42.42 R, 42.42 A, 42.43, 42.44, 42.45 TB, 42.46 B

[56] References Cited

U.S. PATENT DOCUMENTS

| 1,309,144 | 7/1919 | Maise | 296/37.16 |
| 2,518,342 | 8/1950 | Lim | 296/37.14 |

Primary Examiner—Richard A. Bertsch
Attorney, Agent, or Firm—Stevens, Davis, Miller & Mosher

[57] ABSTRACT

A device wherein a cover sheet winder adapted to store a cover sheet is arranged in the luggage space of an automobile, so that when luggage is placed on the luggage floor, the cover sheet is extended to cover up the luggage floor.

13 Claims, 14 Drawing Figures 4,168,094

DEVICE FOR COVERING UP A PARCEL FLOOR IN AN AUTOMOBILE

BACKGROUND OF THE INVENTION

This invention relates to a device for covering up the luggage floor of an automobile having a luggage space, such as a station wagon and a panel van.

Usually, the luggage space at the rear part of a station wagon, a panel van or the like is left open. Therefore, a load is seen from inside and outside the car, and the external appearance is spoilt.

An object of this invention is to provide a device for covering up a luggage floor according to which, only when it is necessary, a cover sheet winder is attached to the walls of a luggage space and a cover sheet is drawn out to cover up the luggage floor, whereas when it is unnecessary, the sheet is wound into the winder and the winder is detached.

Another object of this invention is to provide a device for covering up a luggage floor which can be easily mounted on existing vehicles.

BRIEF DESCRIPTION OF THE DRAWINGS

The objects and features of this invention will become more apparent from the following description taken in conjunction with the accompanying drawings, wherein.

DETAILED DESCRIPTION OF THE PREFERRED EMBODIMENTS

Figure 1:
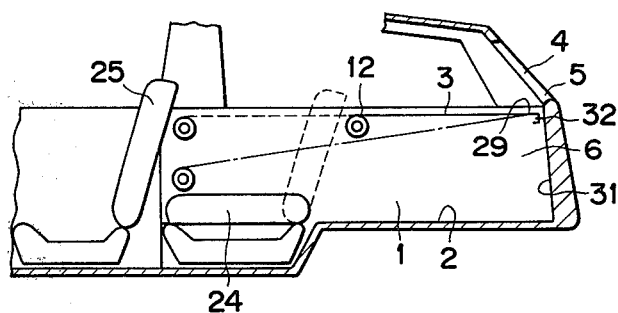
FIG. 1 is a schematic vertical sectional view of the luggage space portion of a station wagon to which the covering device of this invention is applied.

FIG. 1 illustrates an aspect of performance in whih the covering device of this invention is applied to a station wagon. A compartment 1 defines a luggage space, and is provided with a cover sheet 3 having an area large enough to cover up a luggage floor 2.

In order to avoid hindering the rear field of view, the cover sheet 3 is extended at a position close to the lower edge 5 of a rear window 4.

The cover sheet 3 is wound around a take-up shaft 13 of a cover sheet winder 12 which is detachably supported by journals 10, 11 between bearing holes 8, 9 formed in the right and left opposing walls 6, 7 of the compartment 1 in opposition to each other. Thus, the cover sheet can be freely drawn out or taken up. To this end, the take-up shaft 13 should preferably be endowed with a spring bias for the take-up by a torque spring or the like.

Figure 4:
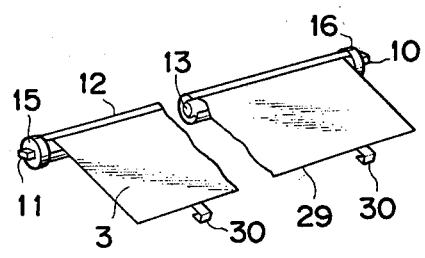
FIG. 4 is a perspective view, partially broken away, of a cover sheet winder.
Figure 5:
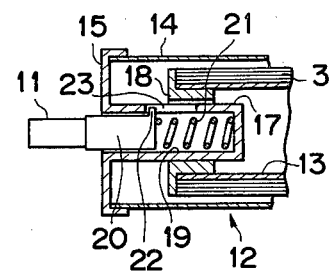
FIG. 5 is a vertical sectional view of a supporting shaft portion of the cover sheet winder.

As shown in FIGS. 4 and 5, the cover sheet winder 12 is such that protuberant shafts 17 protrude inwardly from end plates 15, 16 of an outer barrel 14 and that bearing portions 18 at both the ends of the take-up shaft 13 around which the cover sheet 3 is wound are rotatably fitted to the protuberant shafts 17. The torque spring or the like should preferably be retained between the protuberant shaft 17 and the bearing portion 18.

Of the journals or supporting shafts 10 and 11, one shaft 10 is secured to the end plate 16 of the outer barrel 14, while the other 11 is withdrawably mounted on the end plate 15.

More specifically, the protuberant shaft 17 corresponding to the end plate 15 has a hollow portion 19, in which the hinder part 20 of the supporting shaft 11 is snugly inserted. The supporting shaft 11 is normally held at its protrusive position by the elastic force of a coiled spring 21 which is interposed between the bottom or innermost part of the hollow portion 19 and the inner end face of the hinder part 20. On the other hand, the supporting shaft 11 can be withdrawn into the hollow portion 19 by thrusting it from outside.

In FIG. 5, numeral 22 designates a lug which projects in the radial direction from the hinder part 20 of the supporting shaft 11. Numeral 23 indicates a long window which is provided in the protuberant shaft 17 in order to snugly receive the lug 22. Owing to both of these parts, the supporting shaft 11 protrudes and withdraws with respect to the end plate 15 without turning.

In the illustrated example, the supporting shafts 10, 11 are made prismal or square columnar. Likewise, the bearing holes 8, 9 in the opposing walls 6, 7 of the compartment 1 are made square. Owing to the snug fit between these shafts and holes, the rotation of the outer barrel 14 of the cover sheet winder 12 is checked.

Figure 2:
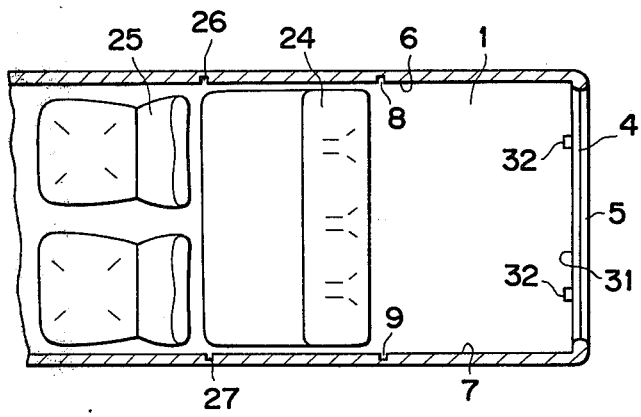
FIG. 2 is a schematic plan view corresponding to FIG. 1.
Figure 3:
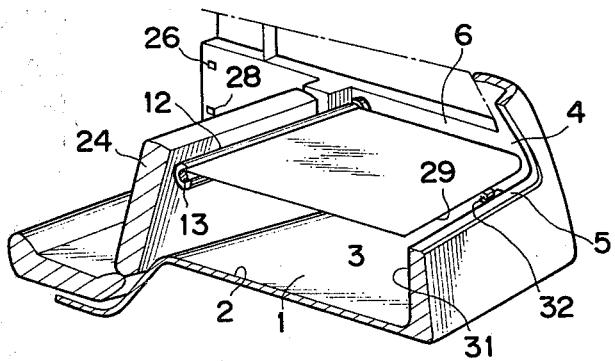
FIG. 3 is a perspective view, partially broken away, of the essential parts of the device.

The bearing holes 8, 9 are provided in the inner panels of the opposing walls 6, 7 on both sides behind the seat back 24 of the rear seat at the rising position thereof. As shown in FIGS. 1, 2 and 3, a set of bearing holes 26, 27 and another set of bearing holes 28, both the sets opposing to each other at two upper and lower positions, are also provided in the inner panels of the opposing walls 6, 7 on both the sides behind the seat back 25 of the front seat. Thus, when the seat back 24 of the rear seat is brought into the collapsed position thereof as illustrated in FIG. 1, the whole area of the luggage floor 2 of the expanded luggage space can be covered up.

A plurality of engaging members, such as hooks 30 are provided at the foremost edge 29 of the cover sheet 3. On the other hand, corresponding engaging members, such as rings 32, are secured onto the wall 31 of the compartment opposite to the cover sheet winder 12 disposed, that is, onto the rear panel of the room of the car in the illustrated example. Thus, the cover sheet 3 drawn out from the cover sheet winder 12 can be held in engagement.

In using the device of this invention, the state in which the cover 3 is entirely wound in the cover sheet winder 12 is established, and the fixed journal 10 of the winder is snugly inserted into one bearing hole 8. Thereafter, the other journal 11 is withdrawn into the hollow portion 19 so as to become even with the end face of the end plate 15, it is guided to the position of the bearing hole 9, and it is snugly inserted into the hole 9. Subsequently, the cover 3 is drawn out to the engaging members 32 of the compartment wall 31, and the engaging members 30 on the side of the cover sheet 3 are fastened to the engaging members 32 of the wall 31.

The device can be adapted for any aspect of use of the station wagon by selecting, according to the rising or falling of the seat back 24 of the rear seat, the bearing holes into which the journals 10, 11 are snugly inserted. When the cover sheet 3 is unnecessary, the cover sheet winder 12 may be detached by reversing the above steps.

Although, in the illustrated embodiment, the supporting shaft 11 is capable of protruding and withdrawing by means of the coiled spring 21, a rubbery elastic body may of course be used for protruding and withdrawing the supporting shaft 11.

Although the cover sheet winder 12 is attached or detached by the protrusion or withdrawal of the supporting shaft 11, any other mounting mechanism may be employed so that the attachment and detachment of the winder 12 can be easily effected.

Figure 6:
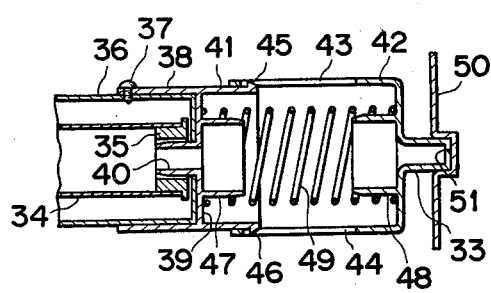
FIG. 6 is a vertical sectional view of the essential parts of another embodiment of the supporting shaft portion.

FIG. 6 shows another embodiment of a shaft tube 33 corresponding to the supporting shaft 11 in FIG. 5. A rotor 35 is snugly fixed to the end of a take-up shaft 34. The rotor 35 is rotatably fitted to and supported by a supporting tube 40 which projects inwardly from a partition plate 39 of a holder barrel 38 fitted to the end of an outer barrel 36 and fixed thereto by a screw 37. The outside periphery 14 of the holder barrel 38 is fitted in a slider barrel 42 which forms the base of the shaft tube 33. Lugs 45, 46 are snugly inserted in slits 43, 44 which are formed along generating lines of the barrel 42. A coiled spring 49 is arranged between a supporting tube 47 projecting outwardly from the partition plate 39 of the holder barrel 38 and a supporting tube 48 projecting inwardly in the slider barrel 42. The spring 49 urges the slider barrel 42, i.e., the shaft tube 33, so as to normally project on the side of a wall 50 of the room of the car. Means for snugly fitting the shaft tube 33 in a bearing hole 51 in the wall 50 is substantially the same as that shown in FIG. 5.

Figure 7:
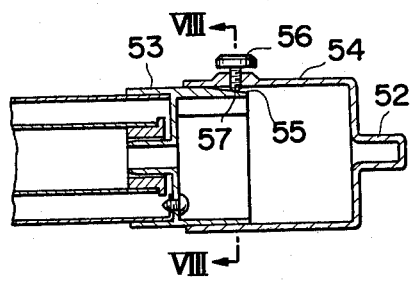
FIG. 7 is a vertical sectional view of the essential parts of still another embodiment of the supporting shaft portion.
Figure 8:
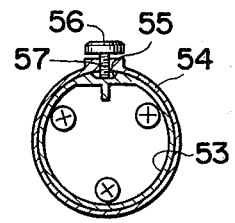
FIG. 8 is a sectional view taken along line VIII—VIII in FIG. 7.

FIGS. 7 and 8 show another embodiment of the protruding and withdrawing structure of a shaft tube 52. A holder barrel 53 corresponding to the holder barrel 38 shown in FIG. 6 is slidably fitted in a slider barrel 54 forming the base of the shaft tube 52. The fore end 57 of a stopper screw 56 threadably mounted on the slider barrel 54 is inserted into an oblique groove 55 formed near the end edge of the holder barrel 53, and the screw 56 is tightly clamped. Thus, it is possible to fix the holder barrel 53 and the slider barrel 54 and to fit and locate the shaft tube 52 in the bearing hole of the wall.

With this structure, the shaft tube 52 is located as described below. The stopper screw 56 is loosened, and the slider barrel 54 is deeply fitted outside the holder barrel 53.

Thereafter, the shaft tube 52 is brought into coincidence with the position of the bearing hole of the wall, not shown. Subsequently, the slider barrel 54 is drawn out, and the shaft tube 52 is fitted into the bearing hole. Lastly, the stopper screw 56 is tightly clamped.

Figure 9:
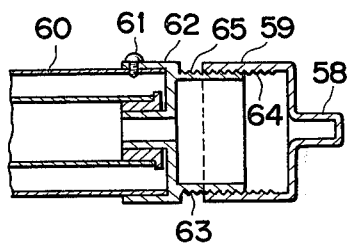
FIG. 9 is a vertical sectional view of the essential parts of a further embodiment of the supporting shaft portion.

FIG. 9 also shows another embodiment of the protruding and withdrawing structure of a shaft tube 58. A threaded barrel 59 forming the base of the shaft tube 58 is threadably mounted on a threaded barrel 63 by threads 64 and 65. The threaded barrel 63 projects from the outer end of a holder barrel 62 which is fitted to the end of an outer barrel 60 and fixed thereto by a screw 61. In this way, the extent of the advance of the shaft tube 58 can be adjusted by the depth of the threadable engagement between the barrel 59 and the barrel 63.

According to this embodiment, the threaded barrel 59 is brought into deep threadable engagement with the threaded barrel 63, and the shaft tube 58 is brought into coincidence with the bearing hole of the wall. Then, the threaded barrel 59 is rotated so as to advance and thereby to snugly insert the shaft tube 58 into the bearing hole.

Figure 10:
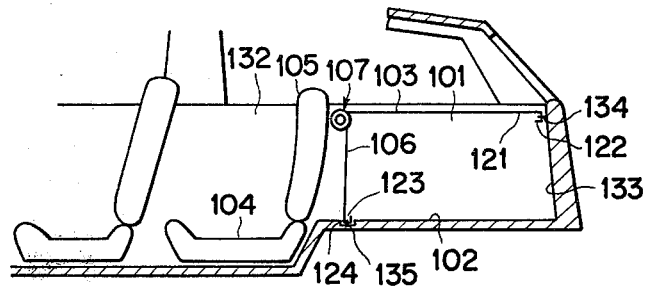
FIG. 10 is a schematic vertical sectional view of the luggage space portion of a station wagon to which another embodiment of the covering device is applied.
Figure 11:
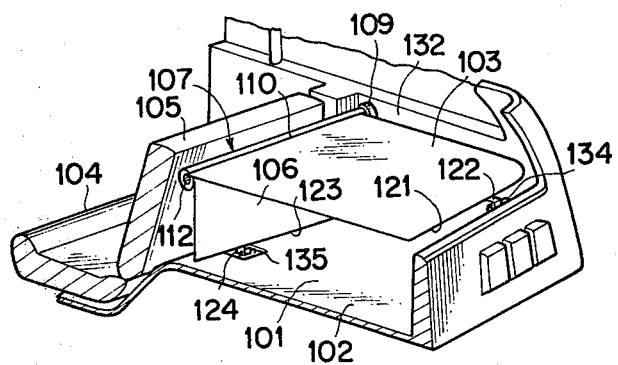
FIG. 11 is a perspective view, partially broken away, of the portion shown in FIG. 10.
Figure 12:
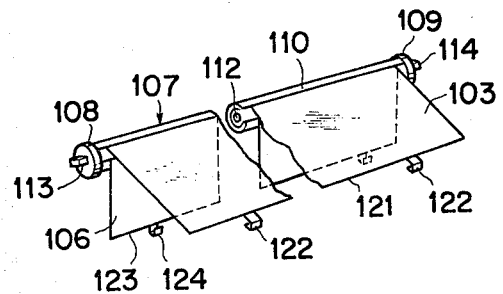
FIG. 12 is a perspective view, partially broken away, of the cover sheet winder in FIG. 10.

Shown in FIG. 10 is another embodiment of the covering device. In a compartment 101 defining a luggage space, there are provided a cover sheet 103 having an area large enough to cover up a luggage floor 102 and another cover sheet 106 for covering a side surface on the side of the seat back 105 of a rear seat 104.

Both the cover sheets 103 and 106 are attached to a cover sheet winder 107. The cover sheet winder 107 is constructed of an outer barrel 110 which has right and left end plates 108, 109, a take-up shaft 112 which is rotatably supported on protuberant shafts 111 protruded inwardly from the end plates 108, 109 and supporting shafts 113, 114 which protrude outwardly from the end plates 108, 109. The cover sheet 103 is pulled in through a window portion 115 of the outer barrel 110, is fixed to a securing portion 116 of the take-up shaft 112 and is taken up on the shaft 112.

In order to automatically execute the take-up, a torque spring (not shown) is interposed between each protuberant shaft 111 and the take-up shaft 112.

The upper edge 118 of the cover sheet 106 is secured (at 120) to the lower side 117 of the window portion 115 of the outer barrel 110 through an anchoring member 119 by such means as bonding, sewing and riveting.

The cover sheet 103 is capable of covering the entire upper surface of the luggage floor 2 when it is drawn out. An engaging member, such as hook 122, adapted to engage an engaging member on the rear wall to be described later is secured to the foremost edge 121 of the cover sheet 103.

The cover sheet 106 is of a length so that it reaches the luggage floor 102 from the cover sheet winder 107 when the winder 107 is attached to the side walls as described hereinafter. An engaging member, such as hook 124, adapted to engage an engaging member on the floor to be described later is secured to the foremost edge 123 of the cover sheet 106.

Figure 13:
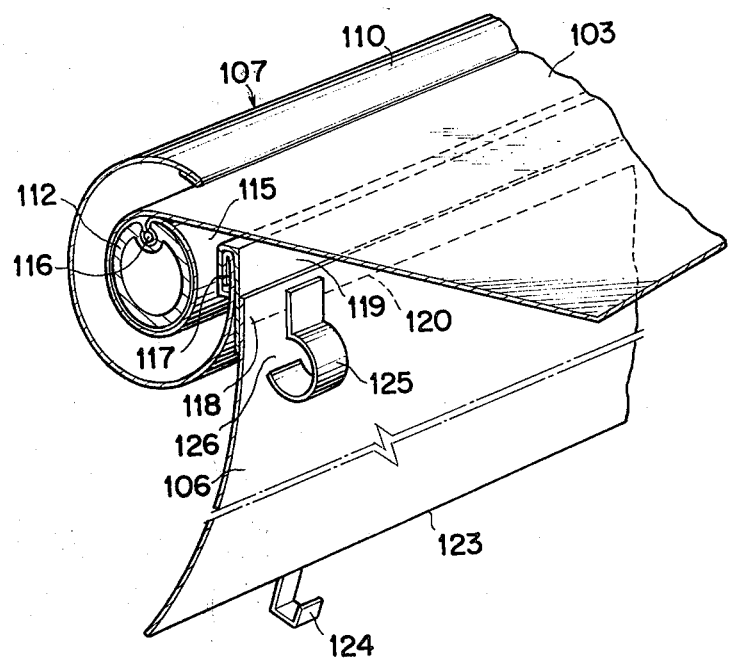
FIG. 13 is a perspective view of the essential parts of the cover sheet winder in FIG. 12.

At the lower side of the window portion 115 of the outer barrel 110, there are secured a suitable number of bundling members 125 which can fasten the cover sheet 106 under a rolled-in or folded-up state. The bundling member 125 illustrated in FIG. 13 is a segmental short cylinder made of an elastic metal. The cover sheet 106 rolled in or folded up is pushed into the segmental short cylinders 125 through openings 126 thereof. Thus, the cylinders 125 can store and hold the cover sheet 106.

The supporting shaft 114 protruding from the end plate 109 of the outer barrel 110 is fixed to the end plate 109. On the other hand, the supporting shaft 113 of the end plate 108 is snugly inserted in a hollow portion 127 of the protuberant shaft 111, protrudes inwards from the end plate 108, so as to protrude and withdraw as illustrated in FIG. 14.

In the illustrated example, a coiled spring 129 is interposed between the rear end face 128 of the supporting shaft 113 and the bottom of the hollow portion 127, so that the supporting shaft 113 is normally maintained at the protruding position by the elasticity of the spring. When the supporting shaft 113 is thrust from outside, it can withdraw into the hollow portion 127 while compressing the coiled spring 129. This invention, however, is not restricted to such construction.

Figure 14:
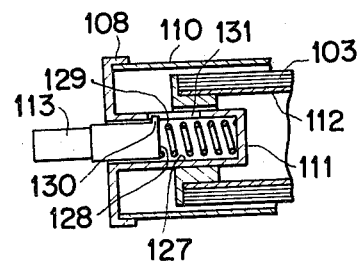
FIG. 14 is a vertical sectional view of a supporting shaft portion of the cover sheet winder in FIG. 10.

In FIG. 14, numeral 130 designates a lug which projects from the supporting shaft 113 outwards in the radial direction. It engages a slot 131 cut in the peripheral wall of the protuberant shaft 111, and fastens the supporting shaft 113 so as not to turn with respect to the outer barrel 110.

The cover sheet winder 107 stated above is attached to the compartment 101 in such a way that the supporting shafts 113, 114 are snugly inserted into bearing holes, not shown, which are formed in the inner panels of the opposing walls of the compartment 101 defining the luggage space, i.e., compartment walls 132 on both the sides of the car body in the illustrated example. In attaching the cover sheet winder, the fixed supporting shaft 114 is snugly inserted into one bearing hole. Thereafter, the other supporting shaft 113 is withdrawn into the end plate 108, and is brought into coincidence with the corresponding bearing hole. Then, the supporting shaft 113 is fitted into the bearing hole owing to the elasticity of the spring. Thus, the attachment is completed.

In order to avoid hindering the rear field of view, the attachment position of the cover sheet winder 107 should preferably be near the lower edge of the window behind the seat back 105 of the rear seat 104. Also, the supporting shafts 113, 114 and the bearing holes should preferably be made square in section.

On the other hand, the engaging member such as ring 134 is secured at the extended position of the cover sheet 103 to the inner panel of the compartment wall opposite to the cover sheet winder 107 mounted in the compartment 101 as stated above, i.e., the rear wall 133 in the illustrated example. The ring 134 engages the engaging member 122 of the cover sheet 103 drawn out from the cover sheet winder 107, and can hold the cover sheet 103 at the extended position.

The engaging member such as ring 135 is also secured to the luggage floor 102 under the attached position of the cover sheet winder 107. It engages the engaging member 124 at the lower edge of the cover sheet 106 when pulled down, and can hold the cover sheet 106 in the hanging position.

The engaging member 135 in the illustrated example is disposed in a recess provided in the luggage floor 102.

The covering device of this invention is constructed as described in detail in connection with the first and second embodiments. Therefore, when luggage is in place, the cover sheet winder is attached to the compartment, and the cover sheet is drawn out and fastened to the opposing wall. Then, the luggage floor of an automobile or the like having a luggage space is covered up, and the external appearance is satisfactory.

When the covering is unnecessary, the luggage space can be left open by putting the cover sheet away into the cover sheet winder. Further, the cover sheet winder storing the cover sheet can be detached.

Since the structure is simple, the device can also be easily mounted on existing vehicles.

What I claim is:

1. In a vehicle having a compartment with spaced opposing walls, a rear wall, and a floor defining a space for luggage, a device for covering the luggage space and floor, said device comprising:
    a cover sheet wide enough to cover said luggage space; and
    a cover sheet winder for winding up said cover sheet, said cover sheet winder having a leading edge and opposite supporting shafts with outer ends; wherein said spaced opposing walls have shaft holes provided in each opposing wall in opposition to one another, the outer ends of said opposite supporting shafts being detachably fitted into said shaft holes, and engaging members provided on the rear wall of said vehicle in opposition to said cover sheet winder for engaging the leading edge of said cover sheet to fasten same.

2. The vehicle as defined in claim 1, wherein a side cover sheet having a length reaching the floor is secured to said cover sheet winder.

3. The vehicle as defined in claim 1, wherein a fastener engaging with said engaging members is provided at a fore end of said cover sheet.

4. The vehicle as defined in claim 1, wherein said shaft holes are provided in a plurality of pairs in right and left opposing walls of the vehicle in opposition to each other.

5. The vehicle as defined in claim 1, wherein a bundling member for storing said side cover is mounted on said cover sheet winder.

6. The vehicle as defined in claim 1, wherein said cover sheet winder comprises;
    a cover sheet take-up shaft,
    a spring means which urges said take-up shaft so that the same is rotated in the direction for the winding of said cover sheet,
    a outer barrel disposed around the periphery of said take-up shaft,
    end plates at both ends of said outer barrel,
    protuberant shafts which are formed by protruding said end plates inwardly,
    bearing portions for said cover sheet winder as are rotatably fitted on said protuberant shafts,
    a first supporting shaft which is secured to one of said end plates of said outer barrel, and
    a second supporting shaft which is mounted on the other end plate of said outer barrel so as to freely protrude and withdraw.

7. The vehicle as defined in claim 6, wherein said protuberant shaft of said other end plate has a hollow portion, a hinder part of said second supporting shaft is snugly inserted in said hollow portion, and a coiled spring is interposed between an innermost part of said hollow portion and an end face of said hinder part of said supporting shaft.

8. The vehicle as defined in claim 7 wherein a lug projecting in a radial direction is formed at said hinder part of said supporting shaft, and a long window for snugly inserting said lug is formed in said protuberant shaft of said other end plate.

9. The vehicle as defined in claim 6, wherein a lug projecting in a radial direction is formed at said hinder part of said supporting shaft, and a long window for snugly inserting said lug is formed in said protuberant shaft of said other end plate.

10. The vehicle as defined in claim 1, wherein said shaft holes and said supporting shafts are respectively formed to be square.

11. The vehicle as defined in claim 1, wherein said cover sheet winder is so constructed that a rotor is fitted and fixed to an end of a winding shaft, that said rotor is rotatably fitted to and supported by a supporting tube which projects inwardly from a partition plate of a holder barrel fitted to and end of an outer barrel, that an outside periphery of said holder barrel is fitted in a slider barrel forming a base of the supporting shaft, that lugs are snugly inserted in slits probided along generating lined of said barrel, and that a coiled spring is arranged between a supporting tube projecting outwardly from said partition plate of said holder barrel and a supporting tube projecting inwardly in said slider barrel.

12. The vehicle as defined in claim 1, wherein said cover sheet winder is so constructed that a rotor is fitted and fixed to an end of a winding shaft, that a holder barrel is slidably fitted in a slider barrel forming a base of the supporting shaft, and that a fore end of a stopper screw threadably mounted on said slider barrel is fitted in an oblique groove formed near an end edge of said holder barrel, said stopper screw being tightly clamped.

13. The vehicle as defined in claim 1, wherein said cover sheet winder is so constructed that a rotor is fitted and fixed to an end of a winding shaft, and that a threaded barrel forming a base of the supporting shaft is threadably engaged with a threaded barrel which projects from an outer end of a holder barrel fitted to an end of an outer barrel and fixed thereto by a screw.

* * * * *